J. W. MINDERFER.
GREASE BOX PLUG LOCK.
APPLICATION FILED MAR. 31, 1917.
1,258,595.
Patented Mar. 5, 1918.
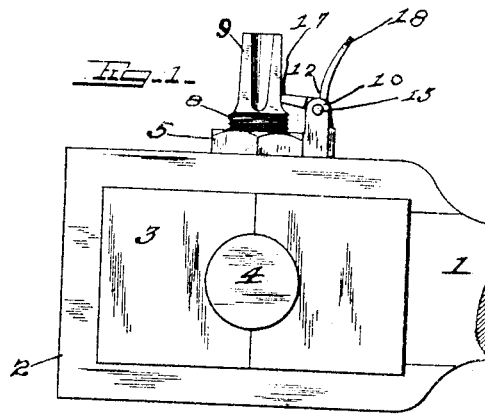
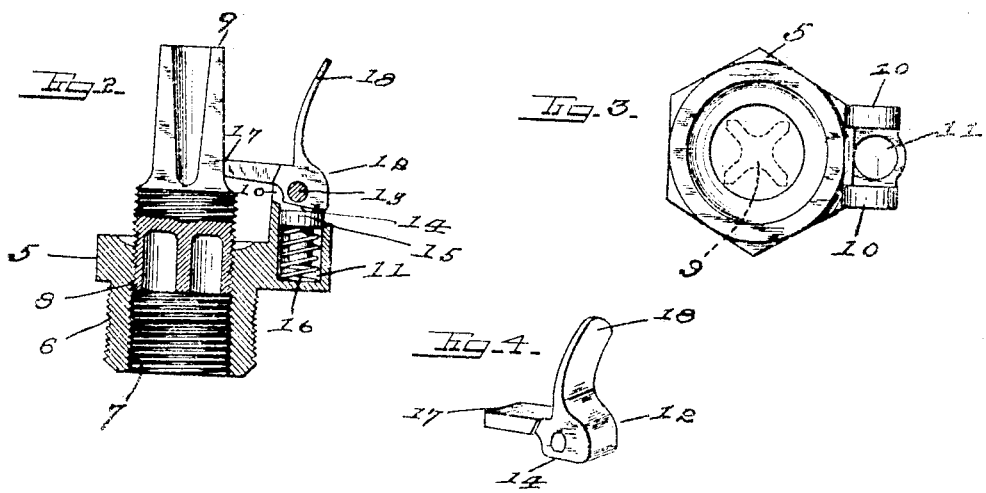

UNITED STATES PATENT OFFICE.

JOHN W. MINDERFER, OF LINCOLN, NEBRASKA.

GREASE-BOX-PLUG LOCK.

1,258,595.   Specification of Letters Patent.   Patented Mar. 5, 1918.

Application filed March 31, 1917.   Serial No. 158,944.

*To all whom it may concern:*

Be it known that I, JOHN W. MINDERFER, a citizen of the United States, residing at Lincoln, in the county of Lancaster and State of Nebraska, have invented certain new and useful Improvements in Grease-Box-Plug Locks, of which the following is a specification.

My invention relates to improvements in grease box plug locks and the primary object of my invention is the provision of means for locking the screw plug used upon grease boxes employed in connection with piston rods, main and side rods, and in fact in connection with any mechanism using such grease boxes and where the plug by reason of constant movement or vibration unscrews and becomes detached.

A further object of my invention is the provision of means for locking the squared end of a grease box plug, such means being of easy application, simple, strong and inexpensive of construction, and which will occupy small space and not interfere with the operation or use of the box or plug.

With the above and other objects in view which will appear as the description proceeds, the invention consists in the novel construction, combination and arrangement of parts, hereinafter described and claimed, it being understood that changes in the precise embodiment of the invention herein disclosed can be made without departing from the spirit of the invention.

In the accompanying drawings I have illustrated one complete example of the physical embodiment of my invention constructed according to the best mode I have so far devised for the practical application of the principles of my invention.

Figure 1 is a side view of a piston rod with my invention applied.

Fig. 2 is a vertical central sectional view of the invention detached and shown on an enlarged scale.

Fig. 3 is a top plan view of the double threaded socket, the angular top of the plug being shown in dotted lines, and Fig. 4 is a perspective view of the finger operated locking lever.

I have shown my improvement in connection with a main piston rod 1, having a yoke 2, confining the bearing 3, of the wrist pin 4, but would have it understood that I claim the right to use my invention upon any character or construction of machinery where it would operate or perform its function efficiently.

The invention consists of the socket 5, having exterior threads 6, and interior threads 7, which interior threads receive the threaded end 8, of the plug which is formed with the upper squared or angular end 9.

The double threaded socket is formed on one side with a pair of ears 10, and the pocket or recess 11 located between said ears, the finger operated locking lever 12 being pivoted or fulcrumed at 13 in the ears and having the flat face 14, against which bears the pawl 15, forced against said face by the coiled spring 16, in the pocket 11. The finger operated locking lever being provided at one end with the squared end 17 for engaging the angular end of the plug and at the other end with the finger engaging portion 18.

From the foregoing description taken in connection with the drawing, the operation of my invention will be at once apparent and it will be readily seen that the finger operated locking lever can be depressed and withdrawn from the path of the screw plug, permitting the insertion of the plug, and that as soon as the plug is screwed home, the release of the locking lever permits the spring pressed pawl to force it into engagement with the angular end of the plug, locking the plug positively and preventing any movement thereof, no matter what the amount of strain, movement, or vibration may be.

It is evident that I provide a device which will prove desirable, efficient and practical and which by reason of its simplicity and small cost should prove a valuable invention.

I claim:—

A grease box plug lock consisting of a double threaded socket, a pair of spaced ears rising therefrom, a threaded plug engaging the socket and formed with an angular portion, a finger operated lever pivoted in said ears, said lever being formed with a flat face and engaging the angular portion of the plug, a pocket between said ears, and a spring pressed pawl in said pocket and engaging the flat face of said lever.

In testimony whereof I affix my signature in the presence of two witnesses.

JOHN W. MINDERFER.

Witnesses:
HERMAN KOENIG,
GEORGE SCHRANK.